Oct. 22, 1946.         W. A. EATON                 2,409,842
              FLUID PRESSURE CONTROL MECHANISM
              Filed July 5, 1944           3 Sheets-Sheet 1
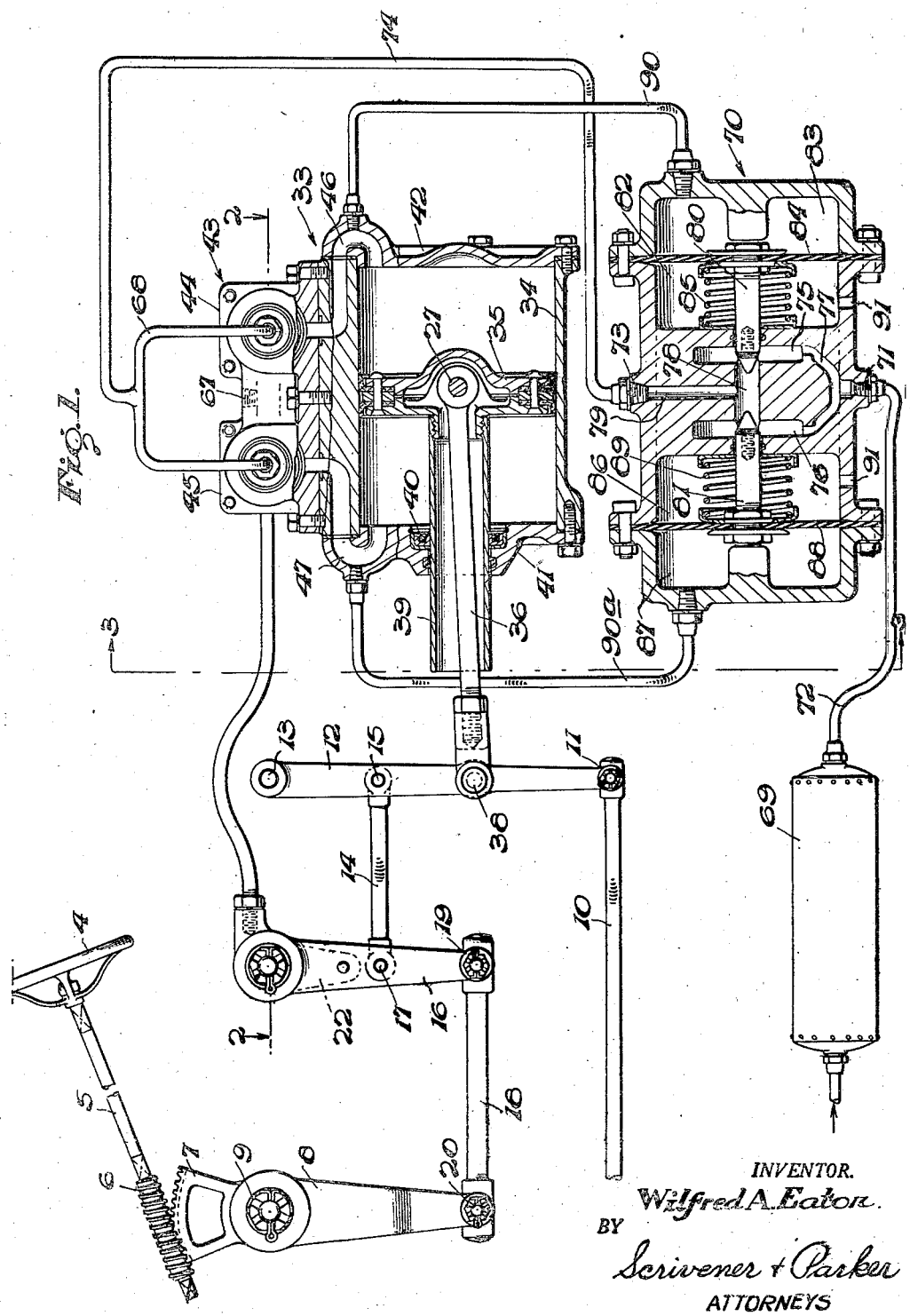
INVENTOR.
Wilfred A. Eaton.
BY
Scrivener † Parker
ATTORNEYS

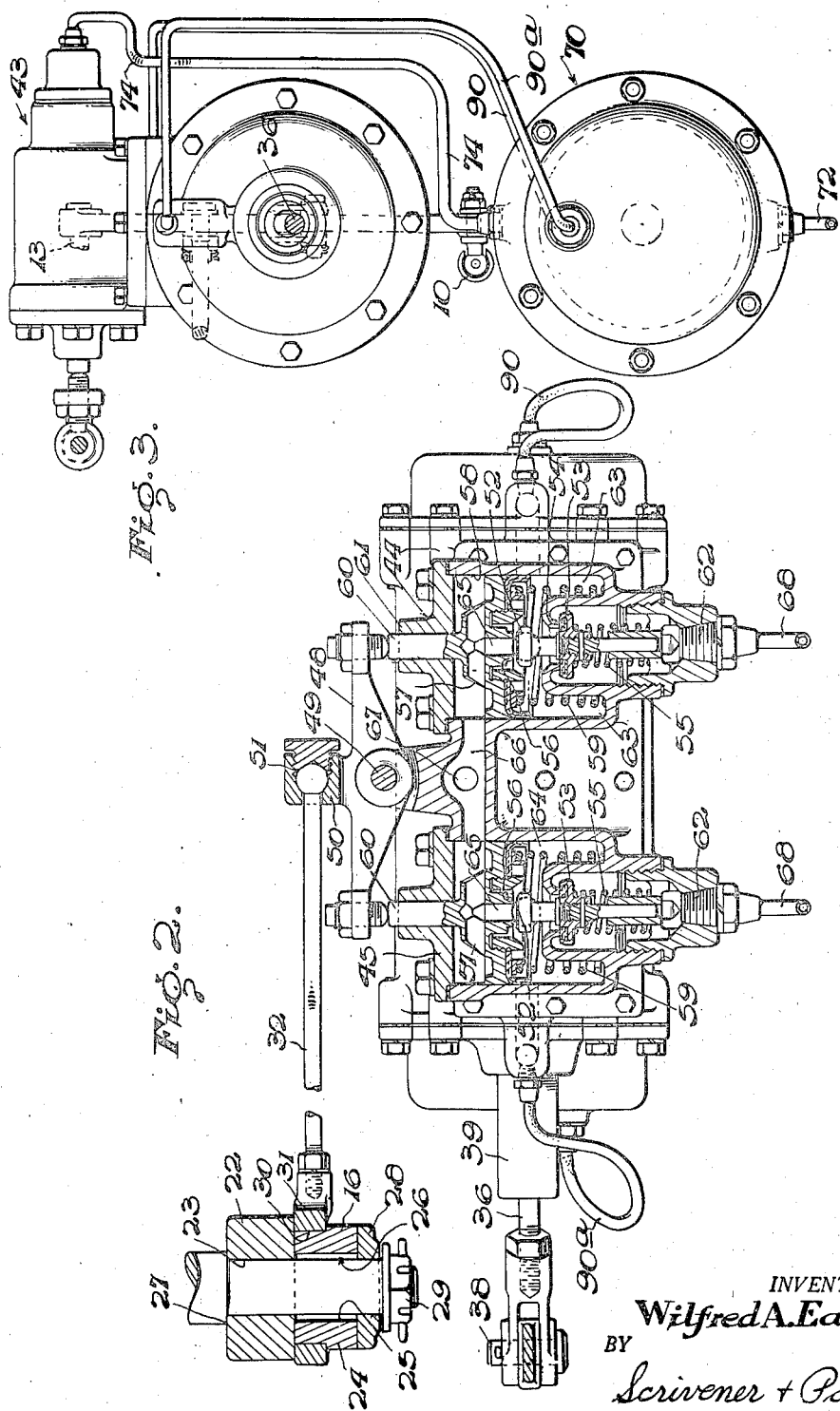

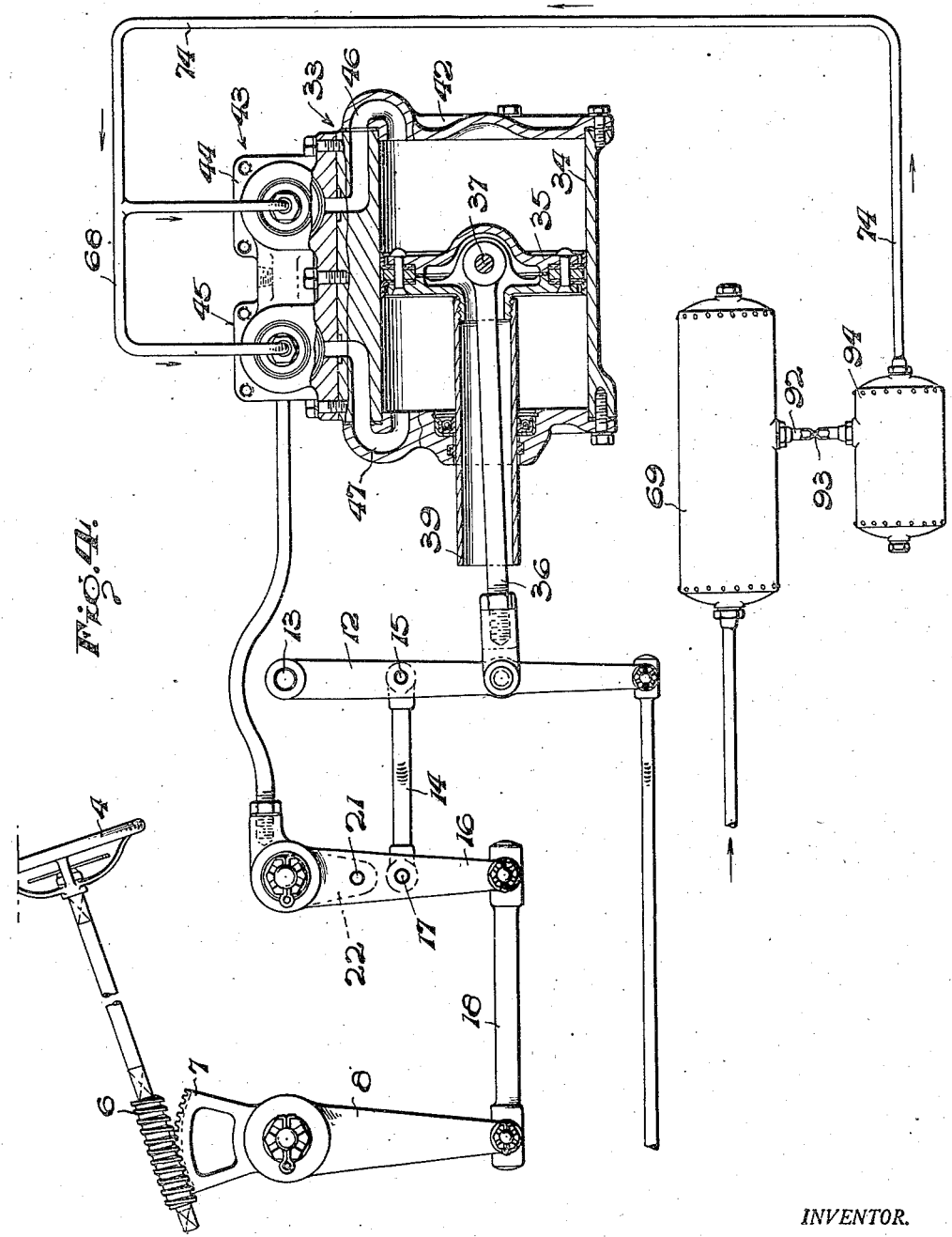

Patented Oct. 22, 1946

2,409,842

UNITED STATES PATENT OFFICE 2,409,842

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application July 5, 1944, Serial No. 543,564

13 Claims. (Cl. 121—41)

This invention relates to control mechanism and more particularly to fluid pressure operated mechanism for steering a vehicle.

It has previously been proposed to provide power operated mechanism for steering vehicles and more particularly fluid pressure operated mechanism wherein the energization of a power actuator is controlled by means of a lost motion connection between the steering wheel of the vehicle and the road wheels of the vehicle, but difficulty has been experienced on certain vehicles equipped with this type of mechanism due to the fact that road shocks imparted to the road wheels of the vehicle have tended to take up the slack in the lost motion connection with a resultant energization of the power actuator tending to cause continuous or auto-reciprocation of the actuator and of the road wheels, more commonly known as shimmy, and it is accordingly an object of the present invention to provide means for overcoming this undesirable condition.

It has been found during experiments with mechanisms of this type which employ a double acting fluid motor for turning the steering wheels in one direction or the other, that during rapid reciprocation of the piston of the fluid motor, the control valves for the motor are unable to exhaust fluid pressure from the motor with sufficient rapidity to prevent the pressure from increasing at the same time on both sides of the piston, and another object of the invention is to utilize this simultaneous increase in pressure on both sides of the piston for the purpose of operating control valve mechanism to reduce the supply of fluid pressure to the control valves of the fluid motor to a point where the fluid pressure supply is insufficient to sustain the reciprocation.

Yet another object of the invention is to provide, in a mechanism of the above type having a pair of control valves for alternately supplying fluid pressure to one end or the other end of the fluid motor, a pair of connections each normally operable to supply fluid pressure from a reservoir to both of the control valves, together with means controlled by the pressure in one end of the motor for controlling the flow of fluid pressure through one of these connections and the pressure in the other end of the motor for controlling the flow of fluid pressure through the other of these connections.

Still another object of the invention is to provide, in a system of the above type having a double acting fluid motor and a pair of control valves for alternately supplying fluid pressure to one end or the other end of the fluid motor, means responsive to pressure conditions in the two ends of the motor for controlling the supply of fluid pressure from the source to the control valves for the purpose of limiting the supply of fluid pressure thereto sufficiently to prevent or minimize auto-reciprocation or shimmy.

Another object of the invention is to provide, in connection with mechanism of the above type, means controlled by pressure conditions in a reciprocating fluid motor for controlling the flow of fluid pressure to the control valves of the motor and for thus governing the speed of reciprocation of the motor.

A still further object of the invention is to provide, in connection with a double acting fluid motor of the above type, means for supplying sufficient fluid pressure to permit rapid operation of the device under normal operating conditions, and for limiting the supply of fluid pressure during auto-reciprocation or more rapid operation to substantially prevent such reciprocation from continuing.

These and other desirable objects and features of the invention will be more readily apparent when taken in connection with the accompanying drawings, wherein two embodiments of the invention is illustrated. It is to be expressly understood, however, that the drawings are employed for purposes of illustration only, and are not designed as a definition of the limits of the invention, reference being had for this purpose to the appended claims.

In the drawings, wherein similar reference characters denote similar parts throughout the several views;

Fig. 1 is a diagrammatic view, partially in section, of power operated steering apparatus utilizing the present invention;

Fig. 2 is a partial sectional view taken along line 2—2 of Fig. 1, of the valve mechanism for controlling the supply of fluid pressure to the motor;

Fig. 3 is an end view of the mechanism taken along line 3—3 of Fig. 1; and

Fig. 4 is a diagrammatic view, partially in section, of a power steering mechanism embodying another form of the invention.

Referring to Fig. 1 of the drawings as well as to Fig. 4, the steering mechanism illustrated therein is generally of the type disclosed in the patent to Stephen Vorech and Stephen Johnson, Jr., No. 2,018,197, dated October 22, 1935, the control valve mechanism being substantially the same as that shown in Fig. 2 of the patent, and the leverage mechanism for operating the control valve mechanism, although differing in detail, being adapted to effect operation of the control valve mechanism in the same manner as the leverage mechanism shown in the patent. As shown in Fig. 1 of the present application, the power operated mechanism includes a steering wheel 4 mounted on the upper end of a rotatable shaft 5, the shaft being provided at its lower end with a worm 6 adapted to engage a worm sector 7 having a lever 8 on its lower end and rotatably mounted in any suitable manner on a shaft 9 carried by the framework of the vehicle, not shown. The arrangement of the worm and worm sector is such that on rotation of the steering wheel in a counterclockwise direction, as viewed by the operator, the sector and lever will be operated in a clockwise direction about the shaft 9 to steer the vehicle to the left, and will be operated in the opposite direction when the steering wheel is rotated in a clockwise direction for the purpose of steering the vehicle to the right.

The dirigible wheels of the vehicle, not shown, are connected in the conventional manner to a drag link 10 having a pivotal connection 11 with the lower end of an operating lever 12, pivotally mounted for rotation on a shaft 13 carried on the framework of the vehicle, and a mechanical connection between the lever 12 and the lever 8 is effected by means of a connecting link 14 pivotally connected to the lever 12 by means of a pin 15 and pivotally connected to a valve operating lever 16 by means of a pin 17, the lower end of the valve operating lever being connected with the lever 8 by means of a connecting rod 18 having a universal joint connection 19 with the lever 16 and a universal joint connection 20 with the lever 8. The lever 16 is supported on a pivot pin 21 carried by a lever 22 mounted for free rotating movement on a shaft 23 rigidly mounted on the frame, the arrangement of the lever and shaft being more fully illustrated in Fig. 2. As shown in Fig. 2, the upper end of the lever 16 is provided with a hub portion 24 having an enlarged bore 25 in spaced relationship with the surface of a portion 26 of the shaft 23, and the levers 22 and 16 are maintained on the shaft 23 between a shoulder 27 formed thereon and a washer 28 retained on the end of the shaft by means of a suitable nut 29. Thus the lever 16 is so supported as to permit the enlarged bore 25 to normally assume a concentric relationship with the shaft portion 26, it thus being apparent that on movement of the lever 16 in a clockwise direction about the pivot pin 17, the hub portion of the lever will tend to move to the right until the left side of the enlarged bore engages the left side of the shaft portion 26. As soon as this engagement occurs, further movement of the lever 16 in the same direction due to continued operation of the connecting rod 18 by the steering mechanism described, will cause the lever to pivot about the line of engagement between the surface of the enlarged bore and the surface of the shaft portion 26, and the movement of the lever will accordingly be imparted to the lever 12 through the connecting rod 14, with the result that the drag link 10 will be moved to the left to steer the vehicle mechanically in that direction. Thus the lever 16 is permitted to rock through a limited arc in either direction about the pivot pin 17, and this movement is utilized to operate control mechanism for a power actuator connected with the lever 12.

The hub 24 of the lever 16, as shown in Fig. 2, is provided with a portion 30 adapted to receive a ring member 31 rotatably mounted thereon, and the ring member is provided with a valve operating rod 32 for operating the valve mechanism. As shown in Fig. 1, a double acting fluid motor 33 is provided having a cylinder 34 and a piston 35 slidably mounted therein, a connecting rod 36 pivotally connected with the piston by means of a pivot pin 37 being connected at its left end with the lever 12 by means of a pivot pin 38.

A tubular extension 39 serving to enclose the rod 36 is threadedly received by the piston and extends to the left through a seal 40 provided in the wall 41 of the cylinder, the right end of the cylinder being closed by a cover plate 42. A control valve mechanism 43 comprising a pair of identical control valves 44 and 45 is mounted on the upper side of the fluid motor 33 as shown, the control valve 44 being adapted to supply fluid pressure to the right end of the motor through a passage 46, and the valve 45 being adapted to supply fluid pressure to the left end of the motor through a passage 47. As shown in more detail in Fig. 2, the control valve is generally of the type disclosed in the above referred to Vorech and Johnson patent. Each of these valves is adapted to be selectively operated by means of a rocker arm 48 pivotally mounted on the valve mechanism by means of a pivot pin 49, rotation of the rocker arm in a clockwise direction being adapted to operate the valve 44, and rotation in the other direction being adapted to operate the valve 45, operation of the rocker arm by movement of the lever 16 being accomplished by means of a lever 50 formed on the arm and connected with the valve operating rod 32 by means of a universal joint 51. Each of the valve mechanisms 44 and 45 includes a normally open exhaust valve 52 and normally closed inlet valve 53. Each of the latter valves is resiliently urged against a seat 54 by means of a spring 55. The exhaust valves are adapted to cooperate with seats 56 formed on pistons 57 slidably received in cylinders 58 formed in the control valves, the pistons being normally urged upward by means of springs 59. Valve actuating stems 60 are slidably mounted in cover members 61 carried on the control valves and are directly connected or integrally formed with the pistons 57. Each of the valves 44 and 45 is provided with an inlet and supply connection 62, the valve 44 being provided with an outlet chamber 63 and the valve 45 being provided with an outlet chamber 64. With the exhaust valves in the position shown, these chambers are connected with atmosphere through passages 65 formed in the pistons and a common exhaust passage 66 provided with an exhaust port 67. Thus on clockwise operation of the rocker arm to move one of the plungers 60 downward, the exhaust valve of the valve 44 is closed and the inlet valve is opened to admit fluid pressure to the outlet chamber 63, while on operation of the rocker arm in the opposite direction, the plunger 60 of the valve 45 is moved downward to close the exhaust valve and open the inlet valve to admit fluid pressure to the outlet chamber 64. As indicated in Fig. 2 and also shown in Fig. 1, the outlet chambers 63 and 64 are connected respectively with the passages 46 and 47 leading to the right and left ends of the cylinder, the valve 44 thus serving to control the pressure of fluid in the right end of the cylinder, while the valve 45 serves to control the pressure in the other end of the cylinder. The right and left inlet passages 62 of the valve mechanism are connected by means of a conduit 68 which is adapted to receive fluid pressure from a supply reservoir 69 through means to be hereinafter described.

In steering mechanisms of this type, the reservoir is normally directly connected with the inlet ports of the control valves, but in the present instance, a control valve mechanism 70 is interposed between the reservoir and the conduit 68 leading to the valves 44 and 45, this valve mechanism being provided with an inlet port 71 connected with the reservoir 69 through a conduit 72, and an outlet port 73 connected with the conduit 68 by means of a conduit 74. A pair of fluid receiving passages 75 and 76 are formed in the valve mechanism 70 as shown and both connected to the inlet port 71 by means of a passage 77, the central portions of these passages being connected by means of a bore 78 which is connected with the outlet port 73 by means of a passage 79, it thus being apparent that both passages 75 and 76 are connected by means of a common conduit 72 with the reservoir 69, and are both connected through passage 78, passage 79 and outlet port 73 with the valve supply conduit 68 through a conduit 74. A valve 80 slidably mounted in the valve mechanism 70 is adapted on movement to the left to close the right end of the bore 78, a valve 81 similarly mounted in the left end of the mechanism 70 being adapted on movement to the right to close the left end of the bore 78. The mechanism 70 is provided at the right end with chambers 82 and 83 separated by means of a flexible diaphragm 84, the central portion of the diaphragm being suitably clamped to the valve member 80 as shown, with a spring 85 interposed between a portion of the mechanism and the diaphragm serving to normally maintain the valve in the open position shown. In like manner the left end of the mechanism is provided with chambers 86 and 87 separated by means of a diaphragm 88 connected with valve 81, and a spring 89 serves to maintain the valve 81 in open position under normal operating conditions. Thus with the parts in the position shown, the inlet and outlet ports 71 and 73 are connected through both of the passages 75 and 76, and in the event one of the valves 80 and 81 is closed, the passage not closed by one of the valves will serve to permit the continued flow of fluid pressure from the reservoir to the control valves of the fluid motor.

As heretofore stated, steering mechanism of the above type have a tendency toward auto-reciprocation, the power necessary to maintain this reciprocation being supplied from the fluid pressure reservoir, and during such reciprocation, it has been found that the valves 44 and 45 are unable to exhaust fluid pressure from the cylinder 34 with sufficient rapidity to alternately reduce the pressure in one end or the other of the cylinder to that of the surrounding atmosphere, and as reciprocation continues, there is a tendency for this residual pressure to increase to an appreciable degree, due to the fact that the valves have insufficient capacity to handle the large volume of fluid being utilized in sustaining the reciprocation. As indicated hereinabove, this action is utilized to control mechanism for controlling the supply of fluid pressure to the control valves 44 and 45, and to this end, the passage 46 leading to the right end of the cylinder is connected to the chamber 83 of the valve mechanism 70 through a conduit 90, while the passage 47 leading from the control valve 45 to the left end of the cylinder is connected with the chamber 87 through a conduit 90a, it being noted in this connection that the chambers 82 and 86 are at all times vented to atmosphere through ports 91. Thus when fluid pressure is supplied to the right end of the cylinder, this pressure is likewise conducted to the chamber 83 and serves to move the diaphragm 84 to the left to move the valve 80 to closed position, but in view of the fact that the left end of the cylinder is at atmospheric pressure during this type of operation, the valve 81 remains in open position, and fluid pressure is supplied to both of the control valves 44 and 45 from the reservoir through conduit 72, inlet port 71, passage 70, passage 76, bore 78, passage 79, outlet port 73, and conduits 74 and 68, it being apparent that in the event both of the valves 80 and 81 are simultaneously closed, or partially closed, the supply of fluid pressure to the valves 44 and 45 will be substantially reduced, with the result that insufficient fluid pressure may be supplied to the control valves on the cylinder to supply the power necessary to sustain auto-reciprocation.

Assuming for example that the lever 8 is moved in a counterclockwise direction to steer the vehicle to the right, the lever 16 will be rotated about the pivot 17 in a counterclockwise direction by virtue of its connection with the lever 8 through the connecting rod 18, and the hub portion 24 will be moved to the left until the right wall of the enlarged bore 30 contacts the surface of the shaft portion 26, thus serving to move the valve operating rod 32 to the left to impart counterclockwise rotation to the rocker arm 48 as viewed in Fig. 2. When this occurs, the plunger 60 of the valve 45 will be moved downward to close the intake valve and open the exhaust valve, whereupon fluid pressure will be supplied from the reservoir to the left end of the cylinder through conduit 72 inlet port 71, passage 77, passages 75 and 76, bore 78, passage 79, port 73, conduits 74 and 68, inlet port 62, open inlet valve 53, outlet chamber 64, and passage 47, thus forcing the piston 45 to the right to impart counterclockwise rotation to the lever 12 by virtue of its connection therewith through connecting rod 36, thus moving the drag link 10 to the right to turn the dirigible wheels of the vehicle to steer the vehicle to the right. As the pressure increases in the left end of the cylinder, the pressure will likewise increase in the chamber 87 of the valve mechanism 70, and when this pressure is sufficient to overcome the tension of the spring 89, the valve 81 will be moved to the right to close the left end of the bore 78 in order to prevent further communication between passage 77 and the bore 78 through the passage 76. The passage 75 will be still effective, however, to permit the flow of fluid pressure to the conduit 74 and to the control valves through the right end of the bore 78, and the mechanism is so adjusted that during normal operation of the steering mechanism, one of the valves 80 and 81 will always be in open position in order to insure a supply of fluid pressure to the control valves 44 and 45 sufficient to effect efficient and satisfactory operation of the steering mechanism. In the event auto-reciprocation of the piston 35 occurs, however, the valves 44 and 45 will be rapidly operated alternately by movement of the rocker arm 48 to rapidly supply fluid pressure to the cylinder and to exhaust fluid pressure therefrom, and due to the rapidity of the reciprocation, neither end of the cylinder is completely exhausted of fluid pressure, with the result that the pressure gradually increases in both ends of the cylinder to a value sufficient to move the diaphragms 84 and 88 against the tension of the springs 85 and 89 to simultaneously close or partially close both of the valves 80 and 81. This action occurs almost instantaneously when the auto-reciprocation of the piston 35 is initiated, and as a result of the closing or partial closing of the valves in response to the simultaneous increase of pressure in both ends of the cylinder, the supply of fluid pressure from the reservoir to both of the control valves through the passages 75 and 76 and the bore 78 is either substantially reduced or entirely cut off until such time as the pressures in the ends of the cylinder and in the chambers 83 and 87 drop sufficiently to permit the valves 80 and 81 to be moved to open position by the operation of the springs 85 and 80. During normal operation, however, operation of the valve 44 to supply air to the right end of the cylinder causes pressure to be supplied to the right end of the valve mechanism 70 to close the valve 80, but on operation of the rocker arm to operate the valve 45, in response to reverse operation of the rocker arm when the steering wheel 4 is turned in the opposite direction by the vehicle operator, the speed of operation is such as to permit the valve 44 to exhaust the right end of the cylinder sufficiently to permit opening of the valve 80 in the valve mechanism 70 before the pressure of fluid in the left end of the cylinder and in the chamber 87 is sufficient to close the valve 81, the result being that during this type of operation, one or the other of the valves 80 or 81 is always open and fluid pressure is supplied at all times to the inlet ports of both of the control valves 44 and 45. When the auto-reciprocation occurs, the operation is such that, as hereinabove described, both valves tend to close or partially close at the same time, and the pressure at which such closing of both valves occurs can be readily adjusted by properly proportioning the areas of the diaphragms and the characteristics of the springs 85 and 89, these being preferably adjusted in such a manner that simultaneous closing of both valves will occur when the pressures on both sides of the piston 35 exceed atmospheric pressure at the same time by a predetermined value.

Referring now to the embodiment of the invention shown in Fig. 4, it will be seen that the mechanism for controlling the steering of the vehicle is identical to that shown in Fig. 1, the difference being in the means utilized for supplying fluid pressure from the reservoir 69 to the inlet ports of the control valves 44 and 45. In view of the explanation given in the preceding paragraph, it will be readily understood that during normal operation of the steering mechanism by operation of the steering wheel 4, the average rate at which fluid pressure must be supplied to the control valves to insure satisfactory operation of the fluid motor is considerably less than that required to maintain auto-reciprocation, and that through the inclusion of means in the fluid pressure supply system which is operative to reduce or limit the supply of fluid pressure to the control valves during auto-reciprocation, this reciprocation may be minimized or substantially eliminated. To this end, fluid pressure is supplied from the reservoir 69 to the conduit 74 leading to the control valves 44 and 45 through a conduit 92 provided with a choke or restricted portion 93 and an auxiliary reservoir 94, the capacity of the auxiliary reservoir being sufficient to insure satisfactory operation of the steering gear cylinder during a normal steering operation to the left or right of the straight ahead position, but being insufficient to sustain auto-reciprocation of the mechanism. In other words, as soon as auto-reciprocation starts, the pressure in the auxiliary reservoir is materially reduced due to the additional fluid pressure required to sustain this auto-reciprocation, and the rate of feed of fluid pressure to the control valves 44 and 45 through conduit 92, choke 93, reservoir 94 and conduit 74 is governed by the choke. The size of this choke is so chosen as to limit the supply of fluid pressure to the control valves to a value slightly less than that required to sustain auto-reciprocation. In this connection, it is pointed out that chokes have previously been utilized for this purpose, but that in most cases these chokes have been interposed in the passages 46 and 47 adjacent the cylinder. The use of chokes in this manner has been of material advantage in minimizing or eliminating auto-reciprocation, but at the same time has so limited the supply of fluid pressure to the cylinder as to prevent the latter from supplying the necessary amount of power to insure sufficiently rapid operation of the steering mechanism when the steering wheel is turned by the operator. Due to the location of the choke as shown between the main reservoir and the auxiliary reservoir, it will be readily apparent that the relatively small auxiliary reservoir supplies sufficient fluid pressure to permit the cylinder to supply the necessary amount of power to operate the steering mechanism when the steering wheel is turned by the operator of the vehicle, but that during auto-reciprocation, when a continuous supply of fluid pressure is required by the control valves and cylinder and the operation is much more rapid, the pressure in the reservoir 94 is rapidly depleted to a point where the flow of fluid pressure to the control valves is governed entirely by the choke 93, and it is thus possible to choose a choke size and auxiliary reservoir size which will prevent auto-reciprocation and which at the same time will supply sufficient fluid pressure to maintain a normal working pressure in the auxiliary reservoir during operation of the mechanism at normal speeds.

There has thus been provided in the present invention, as illustrated in the embodiments shown more particularly in Figs. 1 and 4, simple and efficient means for normally supplying sufficient fluid pressure from the main reservoir to the steering mechanism to insure satisfactory and unrestricted operation, together with means for automatically limiting the supply of fluid pressure to a value which is insufficient to sustain auto-reciprocation of the mechanism when such reciprocation occurs or tends to occur.

While two embodiments of the invention have been illustrated and described with considerable detail, it will be readily understood by those skilled in the art that various changes, substitutions, and rearrangements of the component parts may be resorted to without departing from the spirit of the invention. It is also to be understood that the principles set forth may be embodied in connection with any suitable power medium for effecting and controlling the operation of a fluid motor or power actuator. Reference will, therefore, be had to the appended claims for a definition of the limits of the invention.

What is claimed is:

1. Mechanism for controlling the supply of fluid pressure from a source to a double acting fluid motor of the type having a pair of control valves and a control element for operating said valves to alternately supply fluid pressure to one end or the other end of said motor, said mechanism including a pair of connections each adapted to connect the source with both valves, and means responsive to the pressure in one end of the motor for closing one of said connections and responsive to the pressure in the other end of the motor for closing the other of said connections when said pressures reach predetermined values.

2. Mechanism for controlling the supply of fluid pressure from a source to a double acting fluid motor of the type having a pair of control valves and a control element for operating said valves to alternately supply fluid pressure to one end or the other end of said motor, said mechanism including a pair of connections each adapted to connect the source with both valves, and means controlled by the pressure in the motor for controlling the flow of fluid pressure through said connections including a valve for closing one of the connections when the pressure in one end of the motor reaches a predetermined value and a valve for closing the other connection when the pressure in the other end of the motor reaches a predetermined value.

3. Mechanism for controlling the supply of fluid pressure from a source to a double acting fluid motor of the type having a pair of control valves and a control element for operating said valves to alternately supply fluid pressure to one end or the other end of said motor, said mechanism including a pair of connections each adapted to connect the source with both valves, and valve means controlled by the pressure in one end of the motor for controlling the flow of fluid pressure through one of said connections and controlled by the pressure in the other end of the motor for controlling the flow of fluid pressure through the other of said connections.

4. Mechanism for controlling the supply of fluid pressure from a source to a double acting fluid motor of the type having a pair of control valves and a control element for operating said valves to alternately supply fluid pressure to one end or the other end of said motor, said mechanism including a pair of connections each adapted to connect the source with both control valves, a separate valve for controlling the flow of fluid pressure through one of said connections, means responsive to the pressure in one end of the motor for closing said separate valve when the pressure in said one end of the motor reaches a predetermined value, a valve for controlling the flow of fluid pressure through the other of said connections, and means responsive to the pressure in the other end of the motor for closing the last named valve when the pressure in said other end of the motor reaches a predetermined value.

5. Mechanism for controlling the supply of fluid pressure from a source to a double acting fluid motor of the type having a pair of control valves and a control element for operating said valves to alternately supply fluid pressure to one end or the other end of said motor, said mechanism including a pair of connections each adapted to connect the source with both control valves, a separate valve for controlling the flow of fluid pressure through each of said connections, means for normally maintaining said separate valves in open position, means responsive to the pressure in one end of the motor for moving one of said separate valves to closed position, and means responsive to the pressure in the other end of the motor for moving the other of said separate valves to closed position.

6. Mechanism for controlling the supply of fluid pressure from a source to a double acting fluid motor of the type having a pair of control valves and a control element for operating said valves to alternately supply fluid pressure to one end or the other end of said motor, said mechanism including a pair of connections each adapted to connect the source with both control valves, means responsive to the pressure in one end of the motor for closing one of said connections when the pressure in said one end exceeds a predetermined value, and means responsive to the pressure in the other end of the motor for closing the other of said connections when the pressure in said other end exceeds a predetermined value.

7. The combination with a source of fluid pressure, a double acting fluid motor, valve mechanism operable to alternately supply fluid pressure to one end or to the other end of said motor, and means for connecting said source and valve mechanism, of means associated with said connection means controlled by the pressure in said motor for reducing the flow of fluid pressure between the source and valve mechanism when the pressures in both ends of said motor exceed a predetermined value at the same time including a valve controlled by the pressure in one end of the motor and another valve controlled by the pressure in the other end of the motor.

8. The combination with a source of fluid pressure, a double acting fluid motor, valve mechanism operable to alternately supply fluid pressure to one end or to the other end of said motor, and means for connecting said source and valve mechanism, of valve means associated with said connecting means for controlling the flow of fluid pressure therethrough between said source and motor, said valve means including a pair of passages having a common connection with the valve mechanism and a common connection with the source, a separate valve for controlling the flow of fluid pressure in each of said passages, means controlled by variations in the pressure of fluid in one end of the motor for opening and closing one of said separate valves, and means controlled by variations in the pressure of fluid in the other end of the motor for opening and closing the other of said separate valves.

9. The combination with a source of power, a reversible power actuator, control mechanism operable to alternately energize the actuator for operation in one direction or the other, and means for supplying power from said source to said control mechanism, of control means associated with said supplying means for controlling the degree of power supplied to said control mechanism, said control means including means forming a pair of power supply paths having a common connection with the source and a common connection with the control mechanism, a power controlling element for controlling the degree of power supplied to the control mechanism along each of said paths, means responsive to the power supplied to the actuator to operate it in one direction for controlling the operation of one of said elements, and means responsive to the power supplied to the actuator to operate it in the other direction for controlling the operation of the other of said elements.

10. Mechanism for controlling the supply of power to a power operated device of the type having a reversible power actuator and control means operable to alternately energize the actuator for operation in one direction or the other, said mechanism including means providing a pair of parallel power paths for supplying power to the control means, means responsive to the power supplied to the actuator to operate it in one direction for controlling the degree of power supplied to the control means along one of said paths, and means responsive to the power supplied to the actuator to operate it in the opposite direction for controlling the degree of power supplied to the control means along the other of said paths.

11. Control valve mechanism for controlling the supply of fluid pressure to a double acting fluid pressure motor of the type having a pair of control valves and an element for operating said valves to alternately supply fluid pressure to one end or to the other end of said motor, said valve mechanism including a casing having an inlet port adapted to be connected to a source of fluid pressure, an outlet port adapted to be connected to each of said control valves, a pair of fluid pressure passages both connected with the inlet port and with the outlet port, separate valves for controlling the flow of fluid pressure through each of said passages, means for normally maintaining said valves in open position, a chamber adapted to be connected to one end of the motor, a chamber adapted to be connected to the other end of the motor, a member subjected to the pressure of fluid in the first named chamber for operating one of said separate valves, and a member subjected to the pressure of fluid in the other of said chambers for operating the other of said separate valves.

12. The combination with a double acting fluid motor of the type having control valve mechanism adapted to supply fluid pressure alternately to opposite ends of the motor to effect reciprocation thereof at different rates dependent on the speed of operation of the valve mechanism and a source of fluid pressure for said valve mechanism, of means for limiting the speed of reciprocation of said motor to a predetermined value regardless of the speed of operation of said valve mechanism including a connection between the source and valve mechanism, and means including a pair of valves controlled respectively by the pressures of the fluid in opposite ends of the motor for controlling the flow of fluid pressure through said connection.

13. Control valve mechanism for controlling the supply of fluid pressure to a double acting fluid motor of the type having a pair of control valves and means for operating one of said valves to supply fluid pressure to one end of the motor and for operating the other of said valves to supply fluid pressure to the other end of the motor, said control valve mechanism including a casing having an inlet port adapted to be connected to a source of fluid pressure, an outlet port having a connection with each of said control valves, a pair of separate fluid passages each connected with the inlet and outlet ports, separate valves for controlling the flow of fluid pressure through each of said passages, a pressure responsive member subjected at all times to the pressure of fluid in one end of the motor for closing one of said separate valves, a pressure responsive member subjected at all times to the pressure of fluid in the other end of the motor for closing the other of said separate valves, and separate springs for normally maintaining each of said separate valves in open position until the pressure of the fluid to which each of the corresponding pressure responsive members is subjected reaches a predetermined value.

WILFRED A. EATON.